US011949106B2

(12) United States Patent
Nakai

(10) Patent No.: US 11,949,106 B2
(45) Date of Patent: Apr. 2, 2024

(54) BINDER COMPOSITION FOR SECONDARY BATTERY ELECTRODE, CONDUCTIVE MATERIAL PASTE COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

(71) Applicant: ZEON CORPORATION, Tokyo (JP)

(72) Inventor: Akito Nakai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 476 days.

(21) Appl. No.: 17/312,000

(22) PCT Filed: Dec. 12, 2019

(86) PCT No.: PCT/JP2019/048776
§ 371 (c)(1),
(2) Date: Jun. 9, 2021

(87) PCT Pub. No.: WO2020/137594
PCT Pub. Date: Jul. 2, 2020

(65) Prior Publication Data
US 2022/0059843 A1    Feb. 24, 2022

(30) Foreign Application Priority Data
Dec. 27, 2018    (JP) .................. 2018-245971

(51) Int. Cl.
*H01M 4/62* (2006.01)
*C08L 9/04* (2006.01)

(52) U.S. Cl.
CPC ............... *H01M 4/622* (2013.01); *C08L 9/04* (2013.01); *H01M 4/625* (2013.01); *C08L 2203/20* (2013.01)

(58) Field of Classification Search
CPC ...... C08L 9/04; C08L 2203/20; H01M 4/622; H01M 4/625
See application file for complete search history.

(56) References Cited

U.S. PATENT DOCUMENTS

| 7,262,244 B2 | 8/2007 | Guerin |
| 9,683,067 B2 | 6/2017 | Katada et al. |
| 2010/0063216 A1 * | 3/2010 | Viola .................. C08C 1/04 525/350 |
| 2014/0107275 A1 | 4/2014 | Taichi et al. |
| 2015/0050554 A1 | 2/2015 | Fukumine et al. |
| 2017/0352915 A1 | 12/2017 | Katagiri et al. |
| 2018/0198126 A1 | 7/2018 | Fukumine et al. |
| 2019/0190068 A1 * | 6/2019 | Lee .................. H01M 10/0565 |

FOREIGN PATENT DOCUMENTS

| EP | 3598544 A1 | 1/2020 | |
| JP | H06226403 A | 8/1994 | |
| JP | 2004178879 A | 6/2004 | |
| JP | 2010047767 A | 3/2010 | |
| JP | 4509792 B2 | 7/2010 | |
| JP | 2010146870 A | 7/2010 | |
| JP | 2011204573 A | 10/2011 | |
| JP | 2011204573 A1 * | 10/2011 | |
| JP | 2012204303 A | 10/2012 | |
| JP | 2013179040 A | 9/2013 | |
| JP | 2014203804 A | 10/2014 | |
| JP | 6330801 B2 | 5/2018 | |
| TW | 201802163 A * | 1/2018 | ............ C08F 236/12 |
| WO | WO-2012026462 A1 * | 3/2012 | ........ H01M 10/0525 |
| WO | 2012165578 A1 | 12/2012 | |
| WO | 2013080989 A1 | 6/2013 | |
| WO | 2016103730 A1 | 6/2016 | |
| WO | 2017010093 A1 | 1/2017 | |
| WO | WO-2017010093 A1 * | 1/2017 | ............ C08C 19/02 |
| WO | 2018168615 A1 | 9/2018 | |

OTHER PUBLICATIONS

Oct. 4, 2022, the Extended European Search Report issued by the European Patent Office in the corresponding European Patent Application No. 19903717.7.
Jun. 16, 2021, International Search Report issued in the International Patent Application No. PCT/JP2019/048776.
Mar. 10, 2020, International Search Report issued in the International Patent Application No. PCT/JP2019/048776.

* cited by examiner

*Primary Examiner* — Allison Bourke
*Assistant Examiner* — Robert Gene West
(74) *Attorney, Agent, or Firm* — KENJA IP LAW PC

(57) ABSTRACT

A binder composition for a secondary battery electrode contains a polymer that includes a nitrile group-containing monomer unit, an aromatic vinyl monomer unit, and a linear alkylene structural unit and that has a residual mercaptan content, by mass, of not less than 1 ppm and not more than 50 ppm.

8 Claims, No Drawings

BINDER COMPOSITION FOR SECONDARY BATTERY ELECTRODE, CONDUCTIVE MATERIAL PASTE COMPOSITION FOR SECONDARY BATTERY ELECTRODE, SLURRY COMPOSITION FOR SECONDARY BATTERY ELECTRODE, ELECTRODE FOR SECONDARY BATTERY, AND SECONDARY BATTERY

TECHNICAL FIELD

The present disclosure relates to a binder composition for a secondary battery electrode, a conductive material paste composition for a secondary battery electrode, a slurry composition for a secondary battery electrode, an electrode for a secondary battery, and a secondary battery.

BACKGROUND

Secondary batteries such as lithium ion secondary batteries have characteristics such as compact size, light weight, high energy density, and the ability to be repeatedly charged and discharged, and are used in a wide variety of applications. Therefore, studies have been carried out in recent years with the objective of further raising the performance of secondary batteries through improvement of electrodes and other battery members.

An electrode used in a secondary battery such as a lithium ion secondary battery normally includes a current collector and an electrode mixed material layer (positive electrode mixed material layer or negative electrode mixed material layer) formed on the current collector. The electrode mixed material layer is formed, for example, using a slurry composition in which an electrode active material, a binder composition containing a binder, and so forth are dispersed in a dispersion medium.

In order to further improve the performance of secondary batteries, attempts have been made in recent years to improve binder compositions used in electrode mixed material layer formation.

In one specific example, Patent Literature (PTL) 1 discloses a method of producing a nitrile group-containing copolymer rubber that is a method of producing a nitrile group-containing copolymer rubber having a specific structure and satisfying a specific property, in which a nitrile group-containing copolymer rubber that has not yet undergone a metathesis reaction is subjected to a metathesis reaction in the presence of a chain transfer agent having a specific structure. It is also disclosed that, in polymerization in the production method according to PTL 1, emulsion polymerization is preferably performed using an emulsifier, and any polymerization initiator, molecular weight modifier, or the like can also be used.

CITATION LIST

Patent Literature

PTL 1: JP6330801B2

SUMMARY

Technical Problem

However, it has been difficult to sufficiently increase dispersibility of a conductive material in a conductive material paste or a slurry composition and dispersion stability at high temperatures even when using the conventional binder composition for a positive electrode described above. There is also room for improvement of a positive electrode produced using the conventional binder composition for a positive electrode described above in terms of further reducing internal resistance of a secondary battery.

Accordingly, one object of the present disclosure is to provide a binder composition for a secondary battery electrode with which it is possible to produce a conductive material paste having sufficiently high dispersibility of a conductive material and dispersion stability at high temperatures.

Another object of the present disclosure is to provide a conductive material paste composition for a secondary battery electrode that has sufficiently high dispersibility of a conductive material and dispersion stability at high temperatures and with which it is possible to produce an electrode that can reduce internal resistance when used to form a secondary battery.

Another object of the present disclosure is to provide a slurry composition for a secondary battery electrode with which it is possible to produce an electrode that can reduce internal resistance of a secondary battery obtained when the electrode is used to form a secondary battery.

Another object of the present disclosure is to provide an electrode that can reduce internal resistance of a secondary battery obtained when the electrode is used to form a secondary battery, and a secondary battery that includes this electrode.

Solution to Problem

The inventor conducted diligent investigation with the aim of solving the problem set forth above. The inventor discovered that it is possible to produce a conductive material paste having sufficiently high dispersibility of a conductive material and dispersion stability at high temperatures and an electrode that can reduce internal resistance of a secondary battery obtained when the electrode is used to form a secondary battery through a binder composition for a secondary battery electrode containing a polymer that includes a nitrile group-containing monomer unit, an aromatic vinyl monomer unit, and a linear alkylene structural unit and that has a residual mercaptan content of within a specific range. In this manner, the inventor completed the present disclosure.

Specifically, the present disclosure aims to advantageously solve the problems set forth above, and a presently disclosed binder composition for a secondary battery electrode comprises a polymer, wherein the polymer includes a nitrile group-containing monomer unit, an aromatic vinyl monomer unit, and a linear alkylene structural unit, and residual mercaptan content in the polymer is not less than 1 ppm and not more than 50 ppm based on mass of the polymer. When a polymer contained in a binder composition includes a nitrile group-containing monomer unit, an aromatic vinyl monomer unit, and a linear alkylene structural unit, and residual mercaptan content in the polymer is not less than 1 ppm and not more than 50 ppm based on mass of the polymer in this manner, the binder composition can be used to produce a conductive material paste that has sufficiently high dispersibility of a conductive material and dispersion stability at high temperatures and an electrode that can reduce internal resistance of a secondary battery.

Note that the "residual mercaptan content" in a polymer can be measured by a method described in the EXAMPLES section. Also note that the phrase "includes a monomer unit"

as used with respect to a polymer means that "a polymer obtained with the monomer includes a structural unit derived from the monomer". Moreover, the phrase "includes a linear alkylene structural unit" means that a repeating unit composed of only a linear alkylene structure represented by a general formula —$C_nH_{2n}$— (n is an integer) is included in the polymer. Furthermore, the presence or absence of monomer units and structural units in a polymer and the proportional content thereof can be judged or measured by $^1$H-NMR, for example.

In the presently disclosed binder composition for a secondary battery electrode, a proportion of insoluble content when the polymer is dissolved in N-methylpyrrolidone is preferably 1 mass % or less. Through the proportion of insoluble content when the polymer is dissolved in N-methylpyrrolidone (hereinafter, also referred to simply as the "proportion of insoluble content") being 1 mass % or less, coatability of an obtained slurry composition can be increased. Note that the "proportion of insoluble content" in a polymer can be measured by a method described in the EXAMPLES section.

In the presently disclosed binder composition for a secondary battery electrode, the polymer preferably has a weight-average molecular weight of not less than 10,000 and not more than 2,000,000. When the weight-average molecular weight of the polymer is not less than 10,000 and not more than 2,000,000, internal resistance of an obtained secondary battery can be further reduced, and dispersibility of a conductive material in an obtained conductive material paste can be further increased. Note that the weight-average molecular weight of a polymer can be measured by gel permeation chromatography (GPC).

Moreover, the present disclosure aims to advantageously solve the problems set forth above, and a presently disclosed conductive material paste composition for a secondary battery electrode comprises: a conductive material; and any one of the binder compositions for a secondary battery electrode set forth above. When a paste composition contains any one of the binder compositions for a secondary battery electrode set forth above, the paste composition has sufficiently high dispersibility of a conductive material and dispersion stability at high temperatures, and can be used to produce an electrode that can reduce internal resistance when used to form a secondary battery.

In the presently disclosed conductive material paste composition for a secondary battery electrode, the conductive material may include carbon nanotubes. When a paste composition contains the binder composition set forth above, carbon nanotubes can be well dispersed as a conductive material in the paste composition.

Furthermore, the present disclosure aims to advantageously solve the problems set forth above, and a presently disclosed slurry composition for a secondary battery electrode comprises: an electrode active material; a solvent; and any one of the binder compositions for a secondary battery electrode set forth above. When a slurry composition contains any one of the binder compositions for a secondary battery electrode set forth above, the slurry composition has sufficiently high dispersion stability at high temperatures, and can be used to produce an electrode that can reduce internal resistance of a secondary battery obtained when the electrode is used to form a secondary battery.

Also, the present disclosure aims to advantageously solve the problems set forth above, and a presently disclosed electrode for a secondary battery comprises an electrode mixed material layer formed using the slurry composition for a secondary battery electrode set forth above. An electrode that is formed using the slurry composition for a secondary battery electrode set forth above in this manner can reduce internal resistance of a secondary battery obtained when the electrode is used to form a secondary battery.

Moreover, the present disclosure aims to advantageously solve the problems set forth above, and a presently disclosed secondary battery comprises a positive electrode, a negative electrode, an electrolyte solution, and a separator, wherein at least one of the positive electrode and the negative electrode is the electrode for a secondary battery set forth above. By using the electrode for a secondary battery set forth above in this manner, the secondary battery has low internal resistance and excellent output characteristics.

Advantageous Effect

According to the present disclosure, it is possible to provide a binder composition for a secondary battery electrode with which it is possible to produce a conductive material paste having sufficiently high dispersibility of a conductive material and dispersion stability at high temperatures.

Moreover, according to the present disclosure, it is possible to provide a conductive material paste composition for a secondary battery electrode that has sufficiently high dispersibility of a conductive material and dispersion stability at high temperatures and with which it is possible to produce an electrode that can reduce internal resistance when used to form a secondary battery.

Furthermore, according to the present disclosure, it is possible to provide a slurry composition for a secondary battery electrode with which it is possible to produce an electrode that can reduce internal resistance of a secondary battery obtained when the electrode is used to form a secondary battery.

Also, according to the present disclosure, it is possible to provide an electrode that can reduce internal resistance of a secondary battery obtained when the electrode is used to form a secondary battery, and a secondary battery that includes this electrode.

DETAILED DESCRIPTION

The following provides a detailed description of embodiments of the present disclosure.

The presently disclosed binder composition for a secondary battery electrode can suitably be used in production of a conductive material paste composition for a secondary battery electrode (hereinafter, also referred to simply as a "conductive material paste") and a slurry composition for a secondary battery electrode (hereinafter, also referred to simply as a "slurry composition"). Moreover, a slurry composition for a secondary battery electrode produced using the presently disclosed binder composition for a secondary battery electrode can suitably be used in formation of a positive electrode of a secondary battery such as a lithium ion secondary battery. Furthermore, a feature of the presently disclosed secondary battery is that an electrode for a secondary battery formed using the presently disclosed slurry composition for a secondary battery electrode is used therein.

(Binder Composition for Secondary Battery Electrode)

Features of the presently disclosed binder composition for a secondary battery electrode are that it contains a polymer including a nitrile group-containing monomer unit, an aromatic vinyl monomer unit, and a linear alkylene structural unit as repeating units and that residual mercaptan content in the polymer is not less than 1 ppm and not more than 50 ppm based on the mass of the polymer. Through a binder composition containing a polymer that has this chemical composition, it is possible to produce a conductive material paste having sufficiently high dispersibility of a conductive material and dispersion stability at high temperatures. Moreover, through a slurry composition that contains this polymer, it is possible to form an electrode that has low internal resistance when used to form a secondary battery. These benefits can be displayed as a result of the prescribed chemical composition and property of the polymer set forth above. In particular, through the residual mercaptan content in the polymer being within the range set forth above, dispersibility of a conductive material can be effectively increased when this polymer is contained in a conductive material paste, and thickening of the conductive material paste under high-temperature conditions can be effectively inhibited. Moreover, by producing a slurry composition using the polymer having a residual mercaptan content that is within the range set forth above, it is possible to increase dispersibility of a conductive material and dispersion stability at high temperatures in the obtained slurry composition, and also to increase coatability of the slurry composition. Furthermore, the inclusion of a nitrile group-containing monomer unit in the polymer can suitably increase solubility of the polymer in an organic solvent such as N-methylpyrrolidone and makes it possible to adjust the viscosity of a conductive material paste or a slurry composition to within a suitable range. Consequently, dispersibility of solid content such as a conductive material in the conductive material paste or slurry composition can be increased. Also, the inclusion of an aromatic vinyl monomer unit in the polymer can increase dispersibility of solid content such as a conductive material when a conductive material paste or a slurry composition is produced. Moreover, the inclusion of a linear alkylene structural unit in the polymer can effectively inhibit the viscosity of a conductive material paste or a slurry composition that contains the polymer from increasing under high-temperature conditions.

<Polymer>

The polymer is a component that functions as a binder. In an electrode produced by forming an electrode mixed material layer on a current collector using a slurry composition for a secondary battery electrode that is produced using the binder composition, the polymer holds components contained in the electrode mixed material layer so that these components do not detach from the electrode mixed material layer. The polymer is required to include a nitrile group-containing monomer unit, an aromatic vinyl monomer unit, and a linear alkylene structural unit. Moreover, residual mercaptan content in the polymer as measured by a specific method is required to be not less than 1 ppm and not more than 50 ppm based on the mass of the polymer. The polymer may optionally include other monomer units so long as the disclosed effects are not lost. The polymer is preferably a hydrogenated polymer obtained through hydrogenation, by a known method, of a polymer that has been obtained through polymerization of a monomer composition containing a nitrile group-containing monomer, an aromatic vinyl monomer, and a conjugated diene monomer.

[Nitrile Group-Containing Monomer Unit]

The nitrile group-containing monomer unit is a repeating unit that is derived from a nitrile group-containing monomer. As a result of the polymer including the nitrile group-containing monomer unit, the polymer has high solubility in an organic solvent such as N-methylpyrrolidone and can increase the viscosity of an obtained slurry composition well while also increasing the viscosity stability of the slurry composition well by inhibiting viscosity change over time.

Examples of nitrile group-containing monomers that can form the nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable as nitrile group-containing monomers from a viewpoint of increasing binding strength of the polymer, with acrylonitrile being more preferable.

One of these nitrile group-containing monomers may be used individually, or two or more of these nitrile group-containing monomers may be used in combination.

The proportional content of the nitrile group-containing monomer unit in the polymer when all repeating units in the polymer are taken to be 100 mass % is preferably 5 mass % or more, and more preferably 10 mass % or more, and is preferably 70 mass % or less, and more preferably 60 mass % or less. When the proportional content of the nitrile group-containing monomer unit in the polymer is not less than any of the lower limits set forth above, solubility of the polymer in an organic solvent such as N-methylpyrrolidone suitably increases, and the viscosity of a conductive material paste or a slurry composition can be adjusted to within a suitable range in a situation in which a conductive material paste or a slurry composition is produced. Consequently, dispersibility of solid content such as a conductive material in the conductive material paste or slurry composition can be increased. Moreover, in a situation in which the slurry composition is used to form an electrode, the polymer can display better binding strength, and peel strength of the electrode can be increased. Furthermore, when the proportional content of the nitrile group-containing monomer unit in the polymer is not more than any of the upper limits set forth above, output characteristics of a secondary battery can be further enhanced. This is presumed to be because excessive increase of the degree of swelling in electrolyte solution of the polymer can be inhibited well and internal resistance of a secondary battery can be reduced in a case in which the proportional content of the nitrile group-containing monomer unit in the polymer is not more than any of the upper limits set forth above.

[Aromatic Vinyl Monomer Unit]

The aromatic vinyl monomer unit is a repeating unit that is derived from an aromatic vinyl monomer. The polymer including the aromatic vinyl monomer unit can increase dispersibility of solid content such as a conductive material in a conductive material paste or a slurry composition.

Examples of monomers that can form the aromatic vinyl polymerization unit include aromatic vinyl monomers such as styrene, α-methylstyrene, and vinyltoluene. Of these aromatic vinyl monomers, styrene is preferable because it has good copolymerizability with other monomers and comparatively few side reactions such as branching reaction, chain reaction, and intermolecular cross-linking of the polymer.

The proportional content of the aromatic vinyl monomer unit in the polymer when all repeating units in the polymer are taken to be 100 mass % is preferably 1 mass % or more, and more preferably 5 mass % or more, and is preferably 50 mass % or less, and more preferably 45 mass % or less.

When the proportional content of the aromatic vinyl monomer unit in the polymer is not less than any of the lower limits set forth above, dispersibility of solid content such as a conductive material can be effectively increased when a conductive material paste or a slurry composition is produced. Moreover, setting the proportional content of the aromatic vinyl monomer unit in the polymer as not more than any of the upper limits set forth above can also effectively increase dispersibility of solid content such as a conductive material when a conductive material paste or a slurry composition is produced.

[Linear Alkylene Structural Unit]

The linear alkylene structural unit (hereinafter, also referred to simply as an "alkylene structural unit") is a repeating unit that is composed of only a linear alkylene structure represented by a general formula —$C_nH_{2n}$— (n is an integer). As a result of the polymer including the linear alkylene structural unit, aggregation or the like of solid content such as a conductive material in a slurry composition as time passes after production of the slurry composition can be inhibited, and dispersion stability of the slurry composition can be increased. Note that from a viewpoint of causing even better display of this effect, the linear alkylene structural unit is preferably a linear alkylene structural unit having a carbon number of 4 or more, and n in the preceding general formula is preferably an integer of 4 or more.

The method by which the linear alkylene structural unit is introduced into the polymer is not specifically limited and may, for example, be either of the following methods (1) or (2).

(1) A method in which a polymer is produced from a monomer composition containing a conjugated diene monomer and then the polymer is hydrogenated to convert a conjugated diene monomer unit to a linear alkylene structural unit (2) A method in which a polymer is produced from a monomer composition containing a 1-olefin monomer such as 1-butene or 1-hexene One of these conjugated diene monomers or 1-olefin monomers may be used individually, or two or more of these conjugated diene monomers or 1-olefin monomers may be used in combination.

Of these methods, method (1) is preferable in terms of ease of production of the polymer.

Examples of conjugated diene monomers that can be used in method (1) include conjugated diene compounds such as 1,3-butadiene, isoprene, 2,3-dimethyl-1,3-butadiene, and 1,3-pentadiene. Of these conjugated diene compounds, 1,3-butadiene is preferable. In other words, the linear alkylene structural unit is preferably a structural unit obtained through hydrogenation of a conjugated diene monomer unit (i.e., a hydrogenated conjugated diene unit), and more preferably a structural unit obtained through hydrogenation of a 1,3-butadiene unit (i.e., a hydrogenated 1,3-butadiene unit). The hydrogenation can be performed by a commonly known method such as described further below.

The proportional content of the linear alkylene structural unit in the polymer when all repeating units (total of structural units and monomer units) in the polymer are taken to be 100 mass % is preferably 10 mass % or more, and more preferably 15 mass % or more, and is preferably 60 mass % or less, and more preferably 50 mass % or less. When the proportional content of the linear alkylene structural unit is not less than any of the lower limits set forth above, the viscosity of a conductive material paste or a slurry composition can be effectively inhibited from increasing under high-temperature conditions. Moreover, when the proportional content of the linear alkylene structural unit is not more than any of the upper limits set forth above, solubility of the polymer in an organic solvent such as N-methylpyrrolidone can suitably be increased, and the viscosity of a conductive material paste or a slurry composition can be more effectively adjusted to within a suitable range. Consequently, dispersibility of solid content such as a conductive material in the conductive material paste or slurry composition can be more effectively increased.

Note that in a case in which the polymer is a hydrogenated polymer obtained through hydrogenation of a polymer that has been obtained through polymerization of a monomer composition containing a conjugated diene as previously described, the hydrogenated polymer can include a linear alkylene structural unit and other conjugated diene-derived units (for example, inclusive of a non-hydrogenated conjugated diene unit). In this case, the total proportional content of the linear alkylene structural unit and other conjugated diene-derived units (hereinafter, also referred to as the "proportional content of conjugated diene-derived units") in the hydrogenated polymer is preferably within any of the preferred proportional content ranges that are set forth above for the "proportional content of the linear alkylene structural unit". Through the total proportion with the proportional content of conjugated diene-derived units being within any of the ranges set forth above, effects such as described in relation to the upper and lower limits for the proportional content of the linear alkylene structural unit can be displayed.

[Other Monomer Units]

Known monomers that are copolymerizable with the monomers described above can serve as other monomers that can form other monomer units without any specific limitations. For example, a hydrophilic group-containing monomer, a (meth)acrylic acid ester monomer, a fluorine-containing monomer, a (meth)acrylamide compound, an epoxy group-containing unsaturated compound, or the like may be used.

One of these monomers may be used individually, or two or more of these monomers may be used in combination. Moreover, in the present specification, "(meth)acryl" is used to indicate "acryl" and/or "methacryl".

The proportional content of other monomer units in the polymer is preferably 20 mass % or less, more preferably 10 mass % or less, and may be 0 mass %. In particular, in a case in which the polymer includes an acidic group-containing monomer unit as another monomer unit, the proportional content of the acidic group-containing monomer unit in the polymer is preferably 10 mass % or less.

Note that the "hydrophilic group-containing monomer" listed as one example of a monomer that can form "another monomer unit" is a monomer that includes a hydrophilic group such as an acidic group or a hydroxy group. Examples of acidic groups include a carboxy group, a sulfo group, and a phosphate group.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a compound including a carboxy group.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth) allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, and 2-hydroxypropyl methacrylate; esters of (meth)acrylic acid and polyalkylene glycol represented by a general formula $CH_2=CR^1-COO-(C_nH_{2n}O)_m-H$ (where m represents an integer of 2 to 9, n represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether and (meth)allyl-2-hydroxypropyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether and (meth)allyl-2-chloro-3-hydroxypropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

Note that the previously described nitrile group-containing monomer unit, aromatic vinyl monomer unit, and linear alkylene structural unit may not include a hydrophilic group such as a carboxy group, a sulfo group, a phosphate group, or a hydroxy group.

[Iodine Value]

The iodine value of the polymer is preferably 80 mg/100 mg or less, more preferably 70 mg/100 mg or less, and even more preferably 50 mg/100 mg or less. Through a polymer having an iodine value that is not more than any of the upper limits set forth above, it is possible to produce a conductive material paste having even higher dispersibility of a conductive material, and, when a slurry composition is produced, it is also possible to increase dispersibility of a conductive material in the slurry composition. Note that the iodine value of the polymer can be 2 mg/100 mg or more, for example. In a case in which the polymer is a hydrogenated polymer, the iodine value of the polymer can be adjusted by altering the hydrogenation conditions. Also note that the "iodine value" of a polymer can be measured in accordance with JIS K6235(2006).

[Weight-Average Molecular Weight]

The weight-average molecular weight of the polymer is preferably 10,000 or more, and more preferably 20,000 or more, and is preferably 2,000,000 or less, more preferably 1,500,000 or less, and even more preferably 1,000,000 or less. When the weight-average molecular weight of the polymer is not less than any of the lower limits set forth above, it is possible to produce a conductive material paste having even higher dispersibility of a conductive material. Moreover, when the weight-average molecular weight of the polymer is not less than any of the lower limits set forth above, the polymer can be inhibited from swelling excessively in electrolyte solution, and internal resistance of an obtained secondary battery can be effectively inhibited from increasing. Furthermore, when the weight-average molecular weight of the polymer is not more than any of the upper limits set forth above, it is possible to effectively inhibit the viscosity of a conductive material paste from increasing and dispersibility of a conductive material from decreasing when a conductive material paste is produced. This makes it possible to form good conduction paths in an electrode and can effectively inhibit internal resistance of an obtained secondary battery from increasing.

[Proportion of NMP-Insoluble Content]

The proportion of insoluble content when the polymer is dissolved in N-methylpyrrolidone is preferably 1 mass % or less, preferably 0.5 mass % or less, and more preferably 0.2 mass % or less. When the proportion of insoluble content in the polymer is not more than any of the upper limits set forth above, it is possible to produce a conductive material paste having even higher dispersibility of a conductive material. Moreover, when the proportion of insoluble content in the polymer is not more than any of the upper limits set forth above, it is possible to produce a slurry composition having even better coatability and to further reduce internal resistance of an obtained secondary battery.

[Residual Mercaptan Content]

The residual mercaptan content in the polymer as measured by a specific method is required to be 1 ppm or more, and preferably 2 ppm or more based on the mass of the polymer, and is required to be 50 ppm or less, preferably 30 ppm or less, and more preferably 23 ppm or less based on the mass of the polymer. When the residual mercaptan content in the polymer is not less than any of the lower limits set forth above, it is possible to produce a conductive material paste having sufficiently high dispersibility of a conductive material. Moreover, when the residual mercaptan content in the polymer is not more than any of the upper limits set forth above, it is possible to effectively inhibit thickening under high-temperature conditions of a conductive material paste in a situation in which the conductive material paste contains this polymer. Furthermore, coatability of an obtained slurry composition can be increased by compounding a polymer having a residual mercaptan content that is not more than any of the upper limits set forth above.

The means by which a mercaptan becomes contained in the polymer may, for example, be through compounding of a mercaptan compound as a molecular weight modifier in polymerization of the polymer by any method. No specific limitations are placed on mercaptan compounds that can be used as molecular weight modifiers, and a compound that includes a mercapto group can preferably be used. Examples include mercapto group-containing compounds having a carbon number of 8 to 12 such as octyl mercaptan, 2,2,4,6,6-pentamethyl-4-heptanethiol, 2,4,4,6,6-pentamethyl-2-heptanethiol, 2,3,4,6,6-pentamethyl-2-heptanethiol, 2,3,4,6,6-pentamethyl-3-heptanethiol, t-dodecyl mercaptan, and n-dodecyl mercaptan; and mercapto group-containing compounds having a carbon number of 13 to 16 such as 2,2,4,6,6-pentamethyl-4-octanethiol and 2,2,4,6,6,8,8-heptamethyl-4-nonanethiol. One of these mercaptan compounds may be used, or a plurality of these mercaptan compounds may be used in combination. Note that in a case in which a plurality of mercaptan compounds is used as a molecular weight modifier, the "residual mercaptan content" described above corresponds to the total amount of the plurality of mercaptan compounds.

[Production Method of Polymer]

No specific limitations are placed on the method by which the polymer set forth above is produced. For example, the polymer can be produced by polymerizing a monomer composition containing the monomers described above in the presence of a molecular weight modifier including a mercaptan compound such as described above and any additives to obtain a polymer and then hydrogenating the obtained polymer.

The proportional content of each monomer in the monomer composition used in production of the polymer can be set in accordance with the proportional content of each repeating unit in the polymer.

The polymerization method is not specifically limited and may, for example, be any of solution polymerization, suspension polymerization, bulk polymerization, and emulsion polymerization. Of these methods, production of the polymer by emulsion polymerization using an emulsifier is preferable (for example, refer to JP6330801B2).

The hydrogenation method of the polymer is not specifically limited and may be a typical method using a catalyst such as an oil-layer hydrogenation method, a water-layer direct hydrogenation method, or a water-layer indirect hydrogenation method (for example, refer to WO2013/080989A1).

In a case in which the previously described method (1) (i.e., a method in which a conjugated diene monomer unit is converted to a linear alkylene structural unit by hydrogenation) is adopted in order to introduce a linear alkylene structural unit into the polymer, it is preferable that hydrogenation is performed after a metathesis reaction of the polymer is performed. The metathesis reaction of the polymer can be performed using a method and a catalyst such as described in JP4509792B2 or WO2016/103730A1, for example, without any specific limitations. Specifically, the metathesis reaction of the polymer can be carried out in the presence of a catalyst and a co-olefin. A known ruthenium-based catalyst can be used as the catalyst of the metathesis reaction. Of such catalysts, Grubbs' catalysts such as bis(tricyclohexylphosphine)benzylidene ruthenium dichloride and 1,3-bis(2,4,6-trimethylphenyl)-2-(imidazolidinylidene)(dichlorophenylmethyl ene)(tricyclohexylphosphine)ruthenium are preferable as the catalyst in the metathesis reaction. Moreover, olefins having a carbon number of 2 to 16 such as ethylene, isobutene, and 1-hexene can be used as the co-olefin.

Furthermore, a known homogeneous hydrogenation catalyst such as Wilkinson's catalyst (($PPh_3$)$_3$RhCl), for example, can be used as a hydrogenation catalyst in hydrogenation performed after the metathesis reaction.

[Solvent]

The binder composition may contain a solvent. The solvent is not specifically limited and may be an organic solvent. Examples of organic solvents that can be used include alcohols such as methanol, ethanol, n-propanol, isopropanol, n-butanol, isobutanol, t-butanol, pentanol, hexanol, heptanol, octanol, nonanol, decanol, and amyl alcohol, ketones such as acetone, ethyl methyl ketone, and cyclohexanone, esters such as ethyl acetate and butyl acetate, ethers such as diethyl ether, dioxane, and tetrahydrofuran, amide polar organic solvents such as N,N-dimethylformamide and N-methylpyrrolidone (NMP), and aromatic hydrocarbons such as toluene, xylene, chlorobenzene, orthodichlorobenzene, and paradichlorobenzene. One of these organic solvents may be used individually, or two or more of these organic solvents may be used as a mixture. Of these examples, NMP is preferable as the solvent.

[Other Components]

In addition to the components described above, the presently disclosed binder composition may contain components such as polymers having different chemical compositions to the previously described polymer and known additives such as those described in JP2013-179040A. One of these components may be used individually, or two or more of these components may be used in combination in a freely selected ratio.

Examples of polymers having a different chemical composition to the previously described polymer include polymers that include a hydrophilic group-containing monomer unit, fluorine-containing polymers (polyvinylidene fluoride (PVdF), etc.), polyacrylonitrile, and polymethyl methacrylate. These polymers differ from the previously described polymer in terms that they include a hydrophilic group-containing monomer unit or do not include at least one of a nitrile group-containing monomer unit, an aromatic vinyl monomer unit, and a linear alkylene structural unit.

<Production Method of Binder Composition>

The presently disclosed binder composition can be produced by mixing the previously described components and the solvent. The mixing method is not specifically limited and may be a mixing method using a mixer such as a ball mill, a sand mill, a bead mill, a pigment disperser, a grinding machine, an ultrasonic disperser, a homogenizer, a planetary mixer, or a FILMIX.

(Conductive Material Paste Composition for Secondary Battery Electrode)

A feature of the presently disclosed conductive material paste composition for a secondary battery electrode (hereinafter, also referred to simply as a "conductive material paste composition") is that it contains the presently disclosed binder composition set forth above and a conductive material. As a result of the presently disclosed conductive material paste composition containing the presently disclosed binder composition, the presently disclosed conductive material paste composition has sufficiently high dispersibility of the conductive material and excellent dispersion stability at high temperatures, and can be used to produce an electrode that can reduce internal resistance when used to form a secondary battery.

<Conductive Material>

The conductive material is a component that is compounded in order to promote electrical contact among an electrode active material in an electrode mixed material layer. Examples of conductive materials that can be used include conductive carbon materials such as carbon black (for example, acetylene black, Ketjenblack® (Ketjenblack is a registered trademark in Japan, other countries, or both), and furnace black), graphite, carbon fiber, and carbon flake; and fibers, foils, and the like of various metals. Of these examples, it is preferable that carbon fiber is included as the conductive material, more preferable that carbon nanofiber such as carbon nanotubes or vapor-grown carbon fiber is included as the conductive material, and more preferable that carbon nanotubes are included as the conductive material.

One of these conductive materials may be used individually, or two or more of these conductive materials may be used in combination.

The BET specific surface area of the conductive material is preferably 100 $m^2/g$ or more, and more preferably 150 $m^2/g$ or more, and is normally 2,500 $m^2/g$ or less. When the BET specific surface area of the conductive material is not less than any of the lower limits set forth above, good conduction paths can be formed in an electrode mixed material layer, and output characteristics of a secondary battery can be further improved. Moreover, when the BET specific surface area of the conductive material is not more than the upper limit set forth above, aggregation of the conductive material can be inhibited, and dispersibility of the conductive material can be ensured.

Note that conductive materials having a large BET specific surface area and fibrous conductive materials such as carbon nanotubes normally tend to aggregate and be difficult to disperse. However, good, stable dispersion is possible even for a conductive material having a large BET specific surface area in the presently disclosed slurry composition for a secondary battery electrode as a result of a binder composition that contains a polymer satisfying the specific chemical composition and property set forth above being used.

<Other Components>

Examples of other components that can be contained in the conductive material paste include, but are not specifically limited to, the same other components as can be contained in the presently disclosed binder composition. One other component may be used individually, or two or more other components may be used in combination in a freely selected ratio.

<Production Method of Conductive Material Paste>

The conductive material paste can be produced by mixing the presently disclosed binder composition set forth above, the conductive material, and other optional components such as a solvent. The mixing method is not specifically limited and may be a mixing method such as previously described in the "Production method of binder composition" section. With regards to the content ratio of the conductive material and the polymer having the prescribed chemical composition set forth above in the conductive material paste, when the content of the conductive material is taken to be 100 parts by mass, the polymer is preferably 1 part by mass or more (i.e., 1/100 or more of contained mass of the conductive material), more preferably 2 parts by mass or more (i.e., 1/50 or more of contained mass of the conductive material), and even more preferably 5 parts by mass or more (i.e., 1/20 or more of contained mass of the conductive material), and is preferably 100 parts by mass or less (i.e., equal to or less than contained mass of the conductive material), more preferably 50 parts by mass or less (i.e., half or less of contained mass of the conductive material), and even more preferably 25 parts by mass or less (i.e., 1/4 or less of contained mass of the conductive material). The solid content concentration of the conductive material paste is, for example, 1 mass % or more, preferably 2 mass % or more, and more preferably 3 mass % or more, and is, for example, 30 mass % or less, preferably 25 mass % or less, and more preferably 20 mass % or less. When the viscosity of the conductive material paste is measured under conditions of a temperature of 25° C. and a shear rate of 0.1 $s^{-1}$ using a rheometer (MCR302 produced by Anton Paar), the viscosity is normally 10,000 Pa·s or less, preferably 5,000 Pa·s or less, more preferably 1,000 Pa·s or less, even more preferably less than 500 Pa·s, and particularly preferably less than 250 Pa·s, and is normally 50 Pa·s or more.

(Slurry Composition for Secondary Battery Electrode)

The presently disclosed slurry composition for a secondary battery electrode contains an electrode active material, a solvent, and the binder composition set forth above, and optionally further contains a conductive material and other components. In other words, the presently disclosed slurry composition for a secondary battery electrode contains an electrode active material, a solvent, and the previously described polymer, and optionally further contains a conductive material and other components. As a result of containing the binder composition set forth above, the presently disclosed slurry composition for a secondary battery electrode can be used to produce an electrode that can reduce internal resistance of a secondary battery obtained when the electrode is used to form a secondary battery.

Although the following describes, as one example, a case in which the slurry composition for a secondary battery electrode is a slurry composition for a lithium ion secondary battery positive electrode, the presently disclosed slurry composition for a secondary battery electrode is not limited to the following example.

<Electrode Active Material>

The electrode active material is a material that gives and receives electrons in an electrode of a secondary battery. A material that can occlude and release lithium is normally used as a positive electrode active material for a lithium ion secondary battery.

Specifically, the positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a lithium-rich spinel compound represented by $Li_{1+x}Mn_{2-x}O_4$ (0<x<2), $Li[Ni_{0.17}Li_{0.2}Co_{0.07}Mn_{0.56}]O_2$, or $LiNi_{0.5}Mn_{1.5}O_4$ without any specific limitations. Examples of lithium-containing complex oxides of Co—Ni—Mn include $Li(Ni_{0.5}Co_{0.2}Mn_{0.3})O_2$ and $Li(Ni_{1/3}Co_{1/3}Mn_{1/3})O_2$.

Of the examples given above, lithium-containing cobalt oxide ($LiCoO_2$), lithium-containing nickel oxide ($LiNiO_2$), a lithium-containing complex oxide of Co—Ni—Mn, $Li[Ni_{0.17}Li_{0.2}Co_{0.07}Mn_{0.56}]O_2$, or $LiNi_{0.5}Mn_{1.5}O_4$ is preferably used as the positive electrode active material from a viewpoint of improving battery capacity and the like of a secondary battery, with the use of a lithium-containing complex oxide of Co—Ni—Mn being more preferable.

The amount and particle diameter of the positive electrode active material may be, but are not specifically limited to, the same as those of conventionally used positive electrode active materials.

<Conductive Material>

The conductive material previously described in the "Conductive material paste composition for secondary battery electrode" section can suitably be used as the conductive material.

<Binder Composition>

The presently disclosed binder composition for a secondary battery electrode set forth above is used as the binder composition.

<Solvent>

Any of the various solvents listed as solvents that can be contained in the presently disclosed binder composition for a secondary battery electrode can be used as the solvent.

<Content Ratio>

The content ratio of the conductive material in the slurry composition when the content of the electrode active material is taken to be 100 parts by mass is preferably not less than 0.01 parts by mass and not more than 20 parts by mass. When the ratio of the conductive material is not less than the lower limit set forth above, electrical contact among the positive electrode active material can be promoted. Moreover, when the amount of the conductive material is not more than the upper limit set forth above, coatability of the slurry composition can be increased.

A preferred content ratio of the polymer in the slurry composition can be within a preferred range for the polymer relative to the conductive material that was previously described in the "Production method of conductive material paste" section and within a preferred range that can be derived from the content ratio of the electrode active material and the conductive material described at the start of this paragraph.

<Other Components>

Examples of other components that can be contained in the slurry composition include, but are not specifically limited to, the same other components as can be contained in the presently disclosed binder composition.

One other component may be used individually, or two or more other components may be used in combination in a freely selected ratio. Of these other components, it is preferable that a fluorine-containing polymer such as polyvinylidene fluoride (PVdF) is used as a second polymer in addition to the previously described polymer (hereinafter, also referred to as the "prescribed polymer") in a case in which the slurry composition for a secondary battery electrode is a slurry composition for a lithium ion secondary battery positive electrode. In a case in which a second polymer is also used as another component, the used amount of the prescribed polymer is preferably 10 mass % or less, and more preferably 5 mass % or less when the total content of the prescribed polymer and the second polymer is taken to be 100 mass %.

<Production Method of Slurry Composition>

The slurry composition set forth above can be produced by dissolving or dispersing the above-described components in a solvent such as an organic solvent. For example, the slurry composition can be produced by mixing the components and the solvent by a known dispersing or mixing method such as described in the "Production method of binder composition" section. Moreover, the slurry composition can be produced by, for example, adding the electrode active material and optional components such as previously described to the presently disclosed conductive material paste and then subjecting these materials to a known dispersing or mixing method such as previously described. Note that a solvent contained in the binder composition may be used as a solvent used for producing the slurry composition. No specific limitations are placed on the order of addition of components during production, and the components may be mixed at once or in stages. From a viewpoint of increasing dispersibility of the conductive material, it is preferable that the conductive material paste set forth above is obtained and then a step of adding and mixing the positive electrode active material and optional components such as a solvent and a second polymer is performed with respect to the conductive material paste. The viscosity of the slurry composition (measured in accordance with JIS Z8803:1991 using a single cylinder rotary viscometer; temperature: 25° C.; rotation speed: 60 rpm) is preferably 1,500 mPa·s or more, and more preferably 4,000 mPa·s or more, and is preferably 20,000 mPa·s or less, and more preferably 5,000 mPa·s or less.

(Electrode for Secondary Battery)

The presently disclosed electrode for a secondary battery includes a current collector and an electrode mixed material layer formed on the current collector, wherein the electrode mixed material layer is formed using the slurry composition for a secondary battery electrode set forth above. In other words, the electrode mixed material layer contains at least an electrode active material and a polymer. Note that components contained in the electrode mixed material layer are components that were contained in the slurry composition for a secondary battery electrode set forth above, and the preferred ratio of these components is the same as the preferred ratio of the components in the slurry composition.

As a result of the presently disclosed electrode for a secondary battery being produced using a slurry composition that contains the presently disclosed binder composition for a secondary battery electrode, the electrode can be used to form a secondary battery having low internal resistance.

<Production Method of Electrode>

The presently disclosed electrode for a secondary battery is produced, for example, through a step of applying the slurry composition set forth above onto a current collector (application step) and a step of drying the slurry composition that has been applied onto the current collector to form an electrode mixed material layer on the current collector (drying step).

[Application Step]

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. Of such current collectors, aluminum foil is particularly preferable as a current collector used for a positive electrode and copper foil is particularly preferable as a current collector used for a negative electrode. One of these materials may be used individually, or two or more of these materials may be used in combination in a freely selected ratio.

[Drying Step]

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, an electrode mixed material layer can be formed on the current collector to thereby obtain an electrode for a secondary battery that includes the current collector and the electrode mixed material layer.

After the drying step, the electrode mixed material layer may be further subjected to a pressing process such as mold pressing or roll pressing. The pressing process can effectively increase the density of the electrode mixed material layer and can also improve close adherence of the electrode mixed material layer and the current collector. Furthermore, when the electrode mixed material layer contains a curable polymer, the polymer is preferably cured after the electrode mixed material layer has been formed.

(Secondary Battery)

The presently disclosed secondary battery includes a positive electrode, a negative electrode, an electrolyte solution, and a separator, wherein at least one of the positive electrode and the negative electrode is the presently disclosed electrode for a secondary battery. The presently disclosed secondary battery has excellent battery characteristics (particularly output characteristics) as a result of including the presently disclosed electrode for a secondary battery.

Although the following describes, as one example, a case in which the secondary battery is a lithium ion secondary battery and the positive electrode is formed of the presently disclosed electrode for a secondary battery, the presently disclosed secondary battery is not limited to the following example.

<Negative Electrode>

The negative electrode may be any known negative electrode. Specifically, the negative electrode may, for example, be a negative electrode formed of a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer may be a layer that contains a negative electrode active material and a binder. The binder is not specifically limited and may be any known material.

<Electrolyte Solution>

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used. The concentration (25° C.) of the supporting electrolyte in the electrolyte solution may, for example, be not less than 0.5 mol/L and not more than 2.0 mol/L.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these organic solvents, carbonates are preferable due to having high permittivity and a wide stable potential region, with the use of a mixture of ethylene carbonate and diethyl carbonate being preferable. Moreover, additives such as vinylene carbonate (VC), fluoroethylene carbonate, and ethyl methyl sulfone can be added to the electrolyte solution.

<Separator>

Examples of separators that can be used include, but are not specifically limited to, those described in JP2012-204303A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the secondary battery, and consequently increases the volumetric capacity.

<Production Method of Secondary Battery>

The presently disclosed secondary battery can be produced by, for example, stacking the positive electrode and the negative electrode with the separator in-between, performing rolling, folding, or the like of the resultant laminate in accordance with the battery shape, as necessary, to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified. Also note that pressures are gauge pressures.

In the examples and comparative examples, the following methods were used to measure and evaluate the chemical composition, residual mercaptan content, proportion of NMP-insoluble content, iodine value, and weight-average molecular weight of a polymer, the dispersibility of a conductive material in a conductive material paste, the dispersion stability at high temperatures of a conductive material paste, the coatability of a slurry composition, and the initial resistance of a secondary battery.

<Chemical Composition of Polymer>

In all of the examples and comparative examples, a linear alkylene structural unit having a carbon number of 4 or more (hydrogenated 1,3-butadiene unit) was confirmed to be present as a result of $^1$H-NMR measurement.

<Residual Mercaptan Content>

In measurement of the residual mercaptan content in a polymer, each polymer obtained in the examples and comparative examples was, in accordance with JIS K6229, subjected to extraction using methanol in order to remove free mercaptan and then drying in order to obtain a polymer as a measurement subject. The polymer obtained as a measurement subject in this manner was heated at a temperature of 150° C. for 20 minutes, and gas released during this heating was measured by gas chromatography-mass spectrometry. Measurement was also performed for a standard substance, and then the amount of mercaptan compound contained in the polymer was measured by a calibration curve method from the retention time, MS spectrum, and peak area. The amount of mercaptan compound measured in this manner is indicated in the "Residual mercaptan content" row of Table 1 in units of ppm based on the overall mass of the polymer. Note that the measurement conditions in measurement by gas chromatography-mass spectrometry were as follows.

<<Measurement Conditions>>

Separation column: HP-5 ms (length 30 m, internal diameter 0.25 mm, film thickness 0.25 μm)

Column oven heating temperature: Held at 40° C. for 3 minutes and then raised to 280° C. at 10° C./min Injection temperature: 300° C.

Detector temperature: 280° C.

Measured ions: 29 to 550

<Proportion of NMP-Insoluble Content>

After 0.5 g of a polymer produced in each example or comparative example with 100 g of NMP was heated at a temperature of 80° C. under stirring to cause dissolution, insoluble content was collected. The collected insoluble content was dried, the mass thereof was subsequently measured, and then calculation of: mass of insoluble content (g)/0.5 (g)×100% was performed.

<Iodine Value of Polymer>

After coagulating 100 g of a water dispersion of a polymer produced in each example or comparative example in 1 L of methanol, vacuum drying was performed at a temperature of 60° C. for 12 hours. The iodine value of the obtained dry polymer was then measured in accordance with JIS K6235 (2006).

<Weight-Average Molecular Weight of Polymer>

The weight-average molecular weight of a polymer produced in each example or comparative example was measured by gel permeation chromatography (GPC). More specifically, a calibration curve was produced for a standard substance using polystyrene in order to calculate the weight-average molecular weight of the polymer as a standard substance-equivalent value. The measurement conditions were as indicated below.

<<Measurement Conditions>>

Column: TSKgel α-M×2 (7.8 mm (internal diameter)×30 cm×2 columns; produced by Tosoh Corporation)

Eluent: Dimethylformamide (50 mM lithium bromide, 10 mM phosphoric acid)

Flow rate: 0.5 mL/min

Sample concentration: Approximately 0.5 g/L (solid content concentration)

Injection volume: 200 μL

Column temperature: 40° C.

Detector: Differential refractive index detector RI (HLC-8320 GPC RI detector produced by Tosoh Corporation)

Detector conditions: RI: Pol (+), Res (1.0 s)

Molecular weight marker: Standard polystyrene kit PStQuick K produced by Tosoh Corporation <Dispersibility of Conductive Material in Conductive Material Paste>

The viscosity of a conductive material paste produced in each example or comparative example was measured under conditions of a temperature of 25° C. and a shear rate of 0.1 s$^{-1}$ using a rheometer (MCR302 produced by Anton Paar). A lower viscosity at the same solid content concentration indicates better conductive material dispersibility.

A: Viscosity of less than 250 Pa·s

B: Viscosity of not less than 250 Pa·s and less than 500 Pa·s

C: Viscosity of 500 Pa·s or more

<High-Temperature Dispersion Stability of Conductive Material Paste>

After stirring 3.0 parts of carbon nanotubes (specific surface area: 150 m$^2$/g) as a conductive material, 0.6 parts (in terms of solid content) of a binder composition, and 96.4 parts of NMP using a disper blade (3,000 rpm, 10 minutes), a bead mill using zirconia beads of 1 mm in diameter was used to perform 1 hour of mixing at a circumferential speed of 8 m/s under conditions of a temperature of 20° C. to produce a conductive material paste having a solid content concentration of 3.6 mass %. The viscosity of the obtained conductive material paste was measured under conditions of a shear rate of 0.1 s$^{-1}$ using a rheometer (MCR302 produced by Anton Paar) in order to determine the pre-heating viscosity η0. In addition, a bead mill using zirconia beads of 1 mm in diameter was used to perform 1 hour of mixing at a circumferential speed of 8 m/s under conditions of a temperature of 40° C. to produce a conductive material paste having a solid content concentration of 3.6 mass %. The viscosity of the obtained conductive material paste was measured under conditions of a shear rate of 0.1 s$^{-1}$ using a rheometer (MCR302 produced by Anton Paar) in order to determine the post-heating viscosity η1. A viscosity maintenance rate Δη(=(η1/η0)×100%) was calculated based on the pre-heating viscosity η0 and the post-heating viscosity η1 that were determined in this manner. A viscosity maintenance rate for the conductive material paste of closer to 100% as calculated in this manner indicates that the conductive material paste has better dispersion stability at high temperatures and that a slurry composition for an electrode containing the conductive material paste will have better dispersion stability at high temperatures.

A: Viscosity maintenance rate of less than 110%

B: Viscosity maintenance rate of not less than 110% and less than 150%

C: Viscosity maintenance rate of 150% or more

<Coatability of Slurry Composition>

In production of a positive electrode in each example or comparative example, application was started, and the coating weight at a time t when a target coating weight was set was taken to be W0. Application was continued for 10 minutes from the time t, and the coating weight at a time 10 minutes after the time t was taken to be W1. A coating weight maintenance rate ΔW (=(W1/W0)×100%) was calculated from W0 and W1. A coating weight maintenance rate of closer to 100% indicates that the slurry composition can be applied more uniformly and leveled more easily, and thus has better coatability.

A: Coating weight maintenance rate of less than 105%
B: Coating weight maintenance rate of not less than 105% and less than 110%
C: Coating weight maintenance rate of 110% or more <Initial Resistance of Secondary Battery>

A secondary battery produced in each example or comparative example was constant-current charged to a battery voltage of 4.2 V at 0.2 C and subsequently constant-voltage charged to a charging current of 0.02 C at 4.2 V under conditions of a temperature of 25° C. Next, the secondary battery was constant-current discharged to a battery voltage of 3.87 V (SOC 50%) at 0.2 C, and then the voltage change after 30 seconds of discharging was measured at each of 0.2 C, 0.5 C, 1.0 C, 2.0 C, 2.5 C, and 3.0 C. A plot of each of the discharge currents and the measured voltage changes was prepared, and the gradient of the plot was taken to be an initial resistance value ($\Omega$). The calculated initial resistance value was evaluated by the following standard.

A: Initial resistance value of less than 4$\Omega$
B: Initial resistance value of not less than 4$\Omega$ and less than 6$\Omega$
C: Initial resistance value of 6$\Omega$ or more Example 1

<Production of Polymer>
[Preparation of Polymer Intermediate]

A reactor was charged with, in order, 180 parts of deionized water, 25 parts of an aqueous solution of sodium dodecylbenzenesulfonate of 10% in concentration (emulsifier for emulsion polymerization), 60 parts of acrylonitrile as a nitrile group-containing monomer, 20 parts of styrene as an aromatic vinyl monomer, 5 parts of methacrylic acid as a hydrophilic group-containing monomer, and 0.6 parts of a mercapto group-containing compound mixture including t-dodecyl mercaptan (mercaptan compound) as a molecular weight modifier (hereinafter, referred to simply as "t-dodecyl mercaptan" in the examples and comparative examples), gas inside the reactor was purged three times with nitrogen, and then 15 parts of 1,3-butadiene as a conjugated diene monomer was charged to the reactor. The reactor was held at 10° C. while 0.1 parts of cumene hydroperoxide (polymerization initiator) and 0.1 parts of ferrous sulfate were charged to the reactor, and a polymerization reaction was continued under stirring until the polymerization conversion rate reached 85%, at which point, 0.1 parts of hydroquinone aqueous solution of 10% in concentration (polymerization inhibitor) was added in order to end the polymerization reaction. Next, residual monomer was removed at a water temperature of 80° C. such that a water dispersion of a polymer precursor (particulate polymer) was obtained (i.e., a latex of nitrile rubber was obtained). A portion of the obtained latex was added to magnesium sulfate aqueous solution, the amount of which was set as 12 mass % relative to nitrile rubber content, and stirring thereof was performed to cause coagulation of the latex. Thereafter, separation by filtration was performed while also performing washing with water, and then the resultant coagulated material was vacuum dried at a temperature of 60° C. for 12 hours to obtain nitrile rubber that was an intermediate for a target polymer (i.e., a polymer intermediate).

[Metathesis of Polymer Intermediate]

Next, 9 parts of the obtained nitrile rubber was dissolved in 141 parts of monochlorobenzene and was loaded into a reactor. The reactor was heated to a temperature of 80° C. and then 2 L of a monochlorobenzene solution containing bis(tricyclohexylphosphine)benzylidene ruthenium dichloride as a Grubbs' catalyst was added such that the amount of the Grubbs' catalyst relative to 100 parts of the polymer was 0.25 parts. The inside of the reactor was then pressurized to 3.5 MPa with ethylene as a co-olefin, and a metathesis reaction of the nitrile rubber was performed with a stirring rate of 600 rpm. During the reaction, the temperature was maintained constant using a cooling coil connected to a heat sensor and a temperature controller.

[Hydrogenation of Metathesized Polymer Intermediate]

The inside of the reactor was subsequently degassed three times with 0.7 MPa $H_2$ while continuing stirring. The temperature of the reactor was then raised to 130° C., and 1 L of a monochlorobenzene solution containing Wilkinson's catalyst and triphenylphosphine was added into the reactor. Note that the amount of Wilkinson's catalyst was set as 0.075 parts and the amount of triphenylphosphine was set as 1 part relative to 100 parts of the metathesized polymer intermediate. The temperature was then raised to 138° C. and a hydrogenation reaction of the polymer was carried out for 6 hours under conditions of a hydrogen pressure of 8.4 MPa to yield a target polymer that was a hydrogenated polymer. Once the reaction had ended, 0.2 parts of activated carbon having an average diameter of 15 μm was added into the reactor, and 30 minutes of stirring was performed. Thereafter, filtration was performed using a filter having a pore diameter of 5 μm to obtain a filtrate. Water vapor was fed into the filtrate, monochlorobenzene was collected and removed by water vapor distillation, and the target polymer (hydrogenated polymer) produced as a precipitate was separated and dried in order to collect the polymer. The residual mercaptan content in the hydrogenated polymer and the iodine value, proportion of NMP-insoluble content, and weight-average molecular weight of the hydrogenated polymer were measured. The results are shown in Table 1.

<Production of Binder Composition for Positive Electrode>

A binder composition (NMP solution) for a positive electrode containing the hydrogenated polymer as a binder was obtained by sampling 64 parts of the hydrogenated polymer obtained as described above, adding 800 parts of N-methylpyrrolidone (NMP) as a solvent, and then performing heating to a temperature of 80° C. to cause dissolution.

<Production of Conductive Material Paste for Positive Electrode>

After stirring 3.0 parts of carbon nanotubes (specific surface area: 150 $m^2/g$) as a conductive material, 0.6 parts (in terms of solid content) of the binder composition described above, and 96.4 parts of NMP using a disper blade (3,000 rpm, 10 minutes), a bead mill using zirconia beads of 1 mm in diameter was used to perform 1 hour of mixing at a circumferential speed of 8 m/s to produce a conductive material paste having a solid content concentration of 3.6 mass %. The dispersibility of the conductive material in the obtained conductive material paste was evaluated as previously described. The result is shown in Table 1.

<Production of Slurry Composition for Positive Electrode>

A slurry composition for a positive electrode was produced by adding 0.04 parts of the conductive material paste for a positive electrode obtained as described above, in terms of solid content of the polymer, 100 parts of a ternary active material having a layered structure ($Li(Ni_{0.5}Co_{0.2}Mn_{0.3})O_2$; average particle diameter: 10 μm) as a positive electrode active material, 0.96 parts (in terms of solid content) of polyvinylidene fluoride (PVdF) as a second polymer, and NMP as an organic solvent, and stirring these materials in a planetary mixer (60 rpm, 30 minutes). Note that the additive amount of NMP was adjusted such that the viscosity of the obtained slurry composition for a positive electrode (measured in accordance with JIS Z8803:1991 using a single cylinder rotary viscometer; temperature: 25° C.; rotation speed: 60 rpm) was within a range of 4,000 mPa·s to 5,000 mPa·s.

<Production of Positive Electrode>

Aluminum foil of 20 μm in thickness was prepared as a current collector. The slurry composition for a positive electrode was applied onto the aluminum foil by a comma coater at 1 m/min such as to have a coating weight after drying of 20 mg/cm$^2$, was dried at a temperature of 90° C. for 20 minutes and a temperature of 120° C. for 20 minutes, and then 10 hours of heat treatment was performed at a temperature of 60° C. to obtain a positive electrode web. Note that coatability of the slurry composition was evaluated by the previously described method during the above. The obtained positive electrode web was rolled by roll pressing to produce a sheet-shaped positive electrode including a positive electrode mixed material layer of 3.2 g/cm$^3$ in density and the aluminum foil. Note that the sheet-shaped positive electrode had a thickness of 70 μm. The sheet-shaped positive electrode was cut to 4.8 cm in width and 50 cm in length to obtain a positive electrode for a lithium ion secondary battery.

<Production of Negative Electrode>

A slurry composition for a negative electrode was produced by stirring a mixture of 90 parts of spherical artificial graphite (volume-average particle diameter: 12 μm) and 10 parts of SiO$_x$ (volume-average particle diameter: 10 μm) as a negative electrode active material, 1 part of a styrene butadiene polymer as a binder, 1 part of carboxymethyl cellulose as a thickener, and a suitable amount of water as a dispersion medium in a planetary mixer.

Next, copper foil of 15 μm in thickness was prepared as a current collector. The slurry composition for a negative electrode was applied onto both sides of the copper foil such as to have a coating weight after drying of 10 mg/cm$^2$ at each side, and was dried at a temperature of 60° C. for 20 minutes and at a temperature of 120° C. for 20 minutes. Thereafter, 2 hours of heat treatment was performed at a temperature of 150° C. to obtain a negative electrode web. The negative electrode web was rolled by roll pressing to produce a sheet-shaped negative electrode including negative electrode mixed material layers (both sides) of 1.8 g/cm$^3$ in density and the copper foil. The sheet-shaped negative electrode was cut to 5.0 cm in width and 52 cm in length to obtain a negative electrode for a lithium ion secondary battery.

<Preparation of Separator>

A separator made of a single layer of polypropylene (produced by Celgard, LLC.; product name: Celgard 2500) was cut out as 120 cm×5.5 cm.

<Production of Lithium Ion Secondary Battery>

The positive electrode and the negative electrode described above were wound up with the separator in-between using a core of 20 mm in diameter to obtain a roll. The obtained roll was compressed to a thickness of 4.5 mm from one direction at a rate of 10 mm/s. Note that the compressed roll had an elliptical shape in plan view, and the ratio of the major axis and the minor axis (major axis/minor axis) was 7.7.

In addition, an electrolyte solution was prepared (chemical composition: LiPF$_6$ solution of 1.0 M in concentration (solvent: mixed solution of 5 mass % of fluoroethylene carbonate added to mixed solvent of ethylene carbonate/ethyl methyl carbonate=3/7 (mass ratio); additive: 2 volume % of vinylene carbonate)).

The compressed roll was subsequently housed inside an aluminum laminate case together with 3.2 g of the non-aqueous electrolyte solution. After connecting a nickel lead to a specific position of the negative electrode and connecting an aluminum lead to a specific position of the positive electrode, an opening of the case was thermally sealed to obtain a lithium ion secondary battery. This lithium ion secondary battery had a pouch shape of 35 mm in width, 48 mm in height, and 5 mm in thickness, and had a nominal capacity of 700 mAh. The obtained lithium ion secondary battery was used to evaluate the initial resistance of the secondary battery as previously described. The result is shown in Table 1.

Example 2

A hydrogenated polymer, a conductive material paste for a positive electrode, a binder composition for a positive electrode, a slurry composition for a positive electrode, a positive electrode for a secondary battery, a negative electrode for a secondary battery, and a secondary battery were produced in the same way as in Example 1 with the exception that the amounts of various monomers and a mercaptan compound were changed to 55 parts of acrylonitrile, 5 parts of styrene, 0.3 parts of t-dodecyl mercaptan, and 35 parts of 1,3-butadiene in production of the polymer. Various measurements and evaluations were carried out in the same way as in Example 1. The results are shown in Table 1.

Example 3

A hydrogenated polymer, a conductive material paste for a positive electrode, a binder composition for a positive electrode, a slurry composition for a positive electrode, a positive electrode for a secondary battery, a negative electrode for a secondary battery, and a secondary battery were produced in the same way as in Example 1 with the exception that the amounts of various monomers and a mercaptan compound were changed to 15 parts of acrylonitrile, 45 parts of styrene, 0.8 parts of t-dodecyl mercaptan, and 35 parts of 1,3-butadiene in production of the polymer. Various measurements and evaluations were carried out in the same way as in Example 1. The results are shown in Table 1.

Example 4

A hydrogenated polymer, a conductive material paste for a positive electrode, a binder composition for a positive electrode, a slurry composition for a positive electrode, a positive electrode for a secondary battery, a negative electrode for a secondary battery, and a secondary battery were produced in the same way as in Example 1 with the exception that the amounts of various monomers were changed to 45 parts of acrylonitrile, 40 parts of styrene, 0 parts of methacrylic acid (i.e., not added), and 15 parts of 1,3-butadiene in production of the polymer. Various measurements and evaluations were carried out in the same way as in Example 1. The results are shown in Table 1.

Example 5

In production of the polymer, metathesis of the polymer intermediate was not performed. Specifically, 9 parts of the polymer obtained in Example 1 was dissolved in 141 parts of monochlorobenzene and was loaded into a reactor. The same operations as in "Hydrogenation of metathesized polymer intermediate" in Example 1 were performed, without performing metathesis of the polymer, so as to hydrogenate the polymer intermediate to yield a hydrogenated polymer. The obtained hydrogenated polymer was used to produce a conductive material paste for a positive electrode, a binder composition for a positive electrode, a slurry composition for a positive electrode, a positive electrode for a secondary battery, a negative electrode for a secondary battery, and a secondary battery. Various measurements and evaluations were carried out in the same way as in Example 1. The results are shown in Table 1.

Comparative Example 1

In production of the polymer, metathesis of the polymer intermediate was not performed. Moreover, in preparation of the polymer intermediate, the amount of t-dodecyl mercaptan (mercaptan compound) used as a molecular weight modifier was set as 2 parts. With the exception of these points, a polymer intermediate was obtained in the same way as in Example 1. Moreover, 9 parts of the obtained polymer intermediate was dissolved in 141 parts of monochlorobenzene and was loaded into a reactor. The same operations as in "Hydrogenation of metathesized polymer intermediate" in Example 1 were performed, without performing metathesis of the polymer, so as to hydrogenate the polymer intermediate to yield a hydrogenated polymer. The obtained hydrogenated polymer was used to produce a conductive material paste for a positive electrode, a binder composition for a positive electrode, a slurry composition for a positive electrode, a positive electrode for a secondary battery, a negative electrode for a secondary battery, and a secondary battery. Various measurements and evaluations were carried out in the same way as in Example 1. The results are shown in Table 1.

Comparative Example 2

A hydrogenated polymer, a conductive material paste for a positive electrode, a binder composition for a positive electrode, a slurry composition for a positive electrode, a positive electrode for a secondary battery, a negative electrode for a secondary battery, and a secondary battery were produced in the same way as in Example 1 with the exception that the molecular weight modifier used in production of the polymer was changed to α-methylstyrene dimer. Various measurements and evaluations were carried out in the same way as in Example 1. The results are shown in Table 1.

Comparative Example 3

A hydrogenated polymer, a conductive material paste for a positive electrode, a binder composition for a positive electrode, a slurry composition for a positive electrode, a positive electrode for a secondary battery, a negative electrode for a secondary battery, and a secondary battery were produced in the same way as in Example 1 with the exception that in production of the polymer, styrene was not added, the amounts of various monomers were changed to 40 parts of acrylonitrile and 55 parts of 1,3-butadiene, and the amount of a mercaptan compound was changed to 0.5 parts. Various measurements and evaluations were carried out in the same way as in Example 1. The results are shown in Table 1.

In Table 1:

"AN" indicates acrylonitrile unit;

"ST" indicates styrene unit;

"H-BD" indicates structural unit represented by general formula —$C_2H_4$— (hydrogenated 1,3-butadiene unit);

"BD" indicates 1,3-butadiene monomer-derived unit other than H-BD;

"TDM" indicates mercapto group-containing compound mixture including t-dodecyl mercaptan;

"αMSD" indicates α-methylstyrene dimer;

"NCM" indicates $Li(Ni_{0.5}Co_{0.2}Mn_{0.3})O_2$;

"PVdF" indicates polyvinylidene fluoride; and

"ND" indicates below limit of detection (Not Detected).

TABLE 1

| | | | | Example 1 | Example 2 | Example 3 | Example 4 | Example 5 | Comparative Example 1 | Comparative Example 2 | Comparative Example 3 |
|---|---|---|---|---|---|---|---|---|---|---|---|
| Slurry composition | Electrode active material | Type | | NCM | NCM | NCM | NCM | NCM | NCM | NCM | NCM |
| | Conductive material | Type | | CNT | CNT | CNT | CNT | CNT | CNT | CNT | CNT |
| | Polymer | Polymer chemical composition | Nitrile group-containing monomer unit | AN [mass %] | 60 | 55 | 15 | 45 | 60 | 60 | 60 | 40 |
| | | | Aromatic vinyl monomer unit | ST [mass %] | 20 | 5 | 45 | 40 | 20 | 20 | 20 | — |
| | | | Hydrophilic group-containing monomer unit | MAA [mass %] | 5 | 5 | 5 | — | 5 | 5 | 5 | 5 |
| | | | Linear alkylene structural unit + conjugated | (H-BD) + BD [mass %] | 15 | 35 | 35 | 15 | 15 | 15 | 15 | 55 |

TABLE 1-continued

| | | | | Example 1 | Example 2 | Example 3 | Example 4 | Example 5 | Comparative Example 1 | Comparative Example 2 | Comparative Example 3 |
|---|---|---|---|---|---|---|---|---|---|---|---|
| | Polymer production conditions | Molecular weight modifier | diene monomer unit Type | TDM | TDM | TDM | TDM | TDM | TDM | αMSD | TDM |
| | | | Amount of TDM | Amount [parts by mass] *based on 100 parts of polymer | 0.6 | 0.3 | 0.8 | 0.6 | 0.6 | 2 | 0.6 | 0.5 |
| | | Metathesis treatment | | Yes | Yes | Yes | Yes | No | No | Yes | Yes |
| | Polymer physical properties | Residual mercaptan content [ppm] *based on mass of polymer | | 12 | 5 | 25 | 12 | 12 | 100 | ND | 10 |
| | | Iodine value [mg/100 mg] | | 11 | 12 | 12 | 12 | 11 | 20 | 12 | 11 |
| | | Proportion of NMP-insoluble content [mass %] | | 0.1 | 0.1 | 0.1 | 0.1 | 0.3 | 0.1 | 5 | 0.1 |
| | | Weight-average molecular weight [×10$^3$] | | 50 | 65 | 35 | 50 | 1200 | 50 | 50 | 55 |
| | Other polymer | Type | | PVdF | PVdF | PVdF | PVdF | PVdF | PVdF | PVdF | PVdF |
| Evaluation | Conductive material paste dispersibility | | | A | A | A | A | B | A | C | C |
| | Conductive material paste high-temperature stability | | | A | A | B | A | A | C | A | A |
| | Slurry composition coatability | | | A | A | A | A | A | B | C | A |
| | Secondary battery initial resistance | | | A | A | A | A | B | A | C | C |

It can be seen from Table 1 that through the binder compositions of Examples 1 to 5, it was possible to produce a conductive material paste having sufficiently high dispersibility of a conductive material and dispersion stability at high temperatures and also to produce an electrode that could reduce internal resistance when used to form a secondary battery.

On the other hand, it can be seen that the various good attributes achieved in Examples 1 to 5 could not be obtained in Comparative Examples 1 and 2 in which the residual mercaptan content in a polymer was outside of a specific range and in Comparative Example 3 in which a polymer that did not include an aromatic vinyl monomer unit was used.

INDUSTRIAL APPLICABILITY

According to the present disclosure, it is possible to provide a binder composition for a secondary battery electrode with which it is possible to produce a conductive material paste having sufficiently high dispersibility of a conductive material and dispersion stability at high temperatures.

Moreover, according to the present disclosure, it is possible to provide a conductive material paste composition for a secondary battery electrode that has sufficiently high dispersibility of a conductive material and dispersion stability at high temperatures and with which it is possible to produce an electrode that can reduce internal resistance when used to form a secondary battery.

Furthermore, according to the present disclosure, it is possible to provide a slurry composition for a secondary battery electrode with which it is possible to produce an electrode that can reduce internal resistance of a secondary battery obtained when the electrode is used to form a secondary battery.

Also, according to the present disclosure, it is possible to provide an electrode that can reduce internal resistance of a secondary battery obtained when the electrode is used to form a secondary battery, and a secondary battery that includes this electrode.

The invention claimed is:

1. A binder composition for a secondary battery electrode comprising a polymer, wherein
   the polymer includes a nitrile group-containing monomer unit, an aromatic vinyl monomer unit, and a linear alkylene structural unit, and
   a residual mercaptan content in the polymer, measurable by using a sample after free mercaptan is excluded in accordance with JIS K6229, is not less than 1 ppm and not more than 50 ppm based on a mass of the polymer.

2. The binder composition for a secondary battery electrode according to claim 1, wherein a proportion of an insoluble content when the polymer is dissolved in N-methylpyrrolidone is 1 mass % or less.

3. The binder composition for a secondary battery electrode according to claim 1, wherein the polymer has a weight-average molecular weight of not less than 10,000 and not more than 2,000,000.

4. A conductive material paste composition for a secondary battery electrode comprising: a conductive material; and the binder composition for a secondary battery electrode according to claim 1.

5. The conductive material paste composition for a secondary battery electrode according to claim 4, wherein the conductive material includes carbon nanotubes.

6. A slurry composition for a secondary battery electrode comprising: an electrode active material; a solvent; and the binder composition for a secondary battery electrode according to claim 1.

7. An electrode for a secondary battery comprising an electrode mixed material layer formed using the slurry composition for a secondary battery electrode according to claim 6.

8. A secondary battery comprising a positive electrode, a negative electrode, an electrolyte solution, and a separator, wherein
    at least one of the positive electrode and the negative electrode is the electrode for a secondary battery according to claim 7.

* * * * *